United States Patent Office 3,381,614
Patented May 7, 1968

3,381,614
ACID PRETREATED POLYETHYLENEGLYCOL TEREPHTHALATE SHEET AS INSULATION FOR SOLID ROCKET PROPELLANT CHARGES
Heinz Ratz, Kolner Str. 179, Troisdorf, Germany; Heinrich Brachert, Mulheimer Str. 12, Troisdorf-Oberlar, Germany; and Ulf Richter, Osenau Post Odenthal, Germany
No Drawing. Filed Sept. 28, 1966, Ser. No. 582,506
Claims priority, application Germany, Oct. 1, 1965, D 48,337
5 Claims. (Cl. 102—103)

ABSTRACT OF THE DISCLOSURE

The invention relates to the use of polyethyleneglycol terephthalate sheet that has been pretreated by immersion into at least one member selected from the group consisting of nitric and sulfuric acids as an insulator for double base rocket propellant charges. The pretreatment produces a change in the sheet's surface which facilitates bonding without impairing the chemical and mechanical properties of the sheet.

This invention relates to the insulation of solid rocket propellant charges.

More particularly this invention relates to the use of polyethyleneglycol terephthalate sheets for the insulation of solid rocket propellant charges.

In certain fields of use in rocket techniques, solid propellents have proved to be most suitable. The simple construction of these engines and their stability are, inter alia, advantages which have contributed essentially to the introduction and continued use thereof. An instance of such a simple rocket engine consists essentially of a solid propellent charge, a chamber in which the propellent charge is located and a nozzle by which a thrust is produced. The control of the course of the combustion of the propellent charge is brought about, the interior-ballistic properties of the propellent charge are fixed and normally cannot be changed, by a specific shaping and by an insulation of the parts of the surface from which no burning is to be effected. The exposed parts of the propellent charge are ignited and the burning proceeds perpendicular to the burning surface. The dependable insulation of the non-burning surface is of particular importance and decisive for the operation of the propellent charge. Such insulation can, for instance, be achieved by applying a non-burnable material to the surface and anchoring it there in such a manner that the flame which is under pressure has no possibility of penetrating between the insulation and the propellent charge. Cylindrical outer surfaces, for instance, of inner burners, are frequently provided with a wrapped film-strip insulation. End insulations can be obtained by applying end discs to the corresponding surfaces. Special requirements are placed on these insulating materials, depending on the type of propellent charge. These include, for example, the requirement that the bond to the propellent charge must not decrease in force during the course of storage necessary prior to use, and insulation must not unfavorably change its properties under stresses caused by changes in temperature or loosen from the propellent charge; and that components of the propellent charge must be prevented from diffusing into the insulation and changing the composition of the latter as well as of the propellent charge.

In United States patent application Ser. No. 573,442, filed July 29, 1966, a process is described for improving the bondability of polyethyleneglycol terephthate sheets which comprises treating a polyethyleneglycol terephthalate sheet with 50 to 100% $HNO_3$ and/or $H_2SO_4$ in a heterogeneous reaction for a short period of time. There is produced as a result of such treatment a change in the sheet's surface which does not impair the valuable chemical and mechanical properties of the sheet but which facilitates bonding.

In accordance with the invention it has now been found that polyethyleneglycol terephthalate sheets which have been treated in accordance with that disclosure, i.e., for short periods of time with concentrated nitric acids and/or sulfuric acids in a heterogeneous reaction, can be advantageously used for the insulating of rocket propellent charges comprising poly-basic powders.

The times of action of the acids on the sheets are in this connection inversely proportional to the acid concentrations and directly proportional to the thickness of the sheets.

As bonding agents, there can suitably be employed solvents and swelling agents which dissolve the surface of the propellent charge, as, for instance, glycol ethers, such as ethyl or butyl glycol, ketones such as acetone, methylethyl ketone, isophorone and cyclohexanone, esters such as ethyl acetate, ethyl lactate, butyl acetate and glycol acetate, as well as their mixtures, or low-percentage solutions of nitrocellulose and ethyl or acetyl cellulose in these solvents. There can further be used as adhesives, solutions of ethylene/vinyl acetate copolymers in esters or chlorinated hydrocarbons as well as solutions of copolyesters such as terephthalic and isophthalic acid polyesters in methylene chloride.

The following examples are given to illustrate the invention, it being understood that these examples are not intended to be limitative with respect to the specific details thereof.

EXAMPLE 1

A sheet of polyethylene glycol terephthalate having a thickness of 0.03 mm. was brought into contact for 1 second with 98% nitric acid and then immediately dipped into a weak soda solution. It was then washed until free of acid. As a result, the sheet became opaque but there was no change in its dimensions. This sheet was then glued using amixture of ethyl glycol, butyl glycol and isophorone to a cylindrical propellent charge consisting of dibasic powder. After a storage period of 2 days, the sheet was so firmly bonded to the powder that it could no longer be torn off without itself tearing or damaging the surface of the powder. The propellent charge had the following composition:

| | Percent |
|---|---|
| Nitroglycerine | 35.0 |
| Nitrocellulose | 50.0 |
| Plasticizer | 10.0 |
| Stabilizers | 1.8 |
| Combustion regulator and | 3.0 |
| Wax | 0.2 |

EXAMPLE 2

A polyethyleneglycol terephthalate sheet having a thickness of 0.03 mm. was dipped for 3 seconds into 70% nitric acid, then immediately squeezed out, neutralized and washed. After drying the surface was slightly opaque but had the same dimensions as the untreated sheet. The bond strength to a double-base powder propellent charge was the same as noted in Example 1.

EXAMPLE 3

A polyethyleneglycol terephthalate sheet having a thickness of 0.125 mm. was dipped for 1 second in a solution of 10% 100%-nitric acid and 90% chloroform, squeezed out, washed in sodium bicarbonate and there-after washed with water. The adhesive properties of the sheet were as set out in Example 1.

EXAMPLE 4

A polyethyleneglycol terephthalate sheet having a thickness of 0.03 mm. was dipped for 10 seconds in 99% sulfuric acid, then neutralized and washed with water. The sheet thereby became opaque to non-transparent. Its bond strength was approximately equal to that of Example 1.

We claim:

1. Method of insulating solid rocket propellent charges which comprises applying by bonding a polyethyleneglycol terephthalate sheet which has been treated by immersing the same into at least one member selected from the group consisting of concentrated nitric and sulfuric acid for a short period of time to the surface of said rocket propellent charge so as to be substantially non-detachable therefrom.

2. Method according to claim 1, wherein said sheet is bonded to said solid rocket propellent charge by means of a bonding agent selected from the group consisting of glycol ethers, ketones, acetate esters, mixtures thereof and low percentage solutions of nitrocellulose, ethyl or acetyl cellulose in said bonding agents.

3. Method according to claim 2 wherein said bonding agent is a mixture of ethyl glycol, butyl glycol and isophorone, and said propellent charge is a double-base powder.

4. An insulated solid rocket propellent charge comprising a double base powder rocket charge and a polyethyleneglycol terephthalate sheet which has been treated by immersion into at least one member selected from the group consisting of nitric and sulfuric acids for a short period of time, non-detachably bonded to the surface of said double base powder propellent charge.

5. An insulated solid rocket propellent charge according to claim 4 wherein the propellent charge had the following composition:

| | Percent |
|---|---|
| Nitroglycerine | 35.0 |
| Nitrocellulose | 50.0 |
| Plasticizer | 10.0 |
| Stabilizers | 1.8 |
| Combustion regulator and | 3.0 |
| Wax | 0.2 |

References Cited

UNITED STATES PATENTS

| 2,643,611 | 6/1953 | Ball | 102—103 |
| 2,958,288 | 11/1960 | Campbell et al. | 102—103 |
| 2,999,462 | 9/1961 | Mosher et al. | 102—103 |
| 3,012,506 | 12/1961 | Mosher et al. | 102—103 |
| 3,215,028 | 11/1965 | Pitchford et al. | 102—103 X |
| 3,250,829 | 5/1966 | Wall | 102—103 X |

CARL D. QUARFORTH, *Primary Examiner.*

BENJAMIN R. PADGETT, *Examiner.*

S. J. LECHERT, JR., *Assistant Examiner.*

UNITED STATES PATENT OFFICE
CERTIFICATE OF CORRECTION

Patent No. 3,381,614                                May 7, 1968

Heinz Ratz et al.

It is hereby certified that error appears in the above numbered patent requiring correction and that the said Letters Patent should read as corrected below.

In the heading to the printed specification, lines 5 to 8, "Heinz Ratz, Kolner Str. 179, Troisdorf, Germany; Heinrich Brachert, Mulheimer Str. 12, Troisdorf-Oberlar, Germany; and Ulf Richter, Osenau Post Odenthal, Germany" should read -- Heinz Ratz, Troisdorf, Germany; Heinrich Brachert, Troisdorf-Oberlar, Germany; and Ulf Richter, Osenau Post Odenthal, Germany, assignors to Dynamit Nobel Aktiengesellschaft, Troisdorf, Germany, a corporation of Germany --. Column 2, line 43, "amixture" should read -- a mixture --. Column 4, lines 25 and 26, "102-103 X", each occurrence, should read -- 102-103 XR --.

Signed and sealed this 14th day of October 1969.

(SEAL)
Attest:

EDWARD M. FLETCHER, JR.                      WILLIAM E. SCHUYLER, JR.
Attesting Officer                                Commissioner of Patents